Feb. 14, 1928.
G. A. PEACOCK
1,659,154
RIM LOCKING STRUCTURE FOR METALLIC WHEELS
Filed May 24, 1927
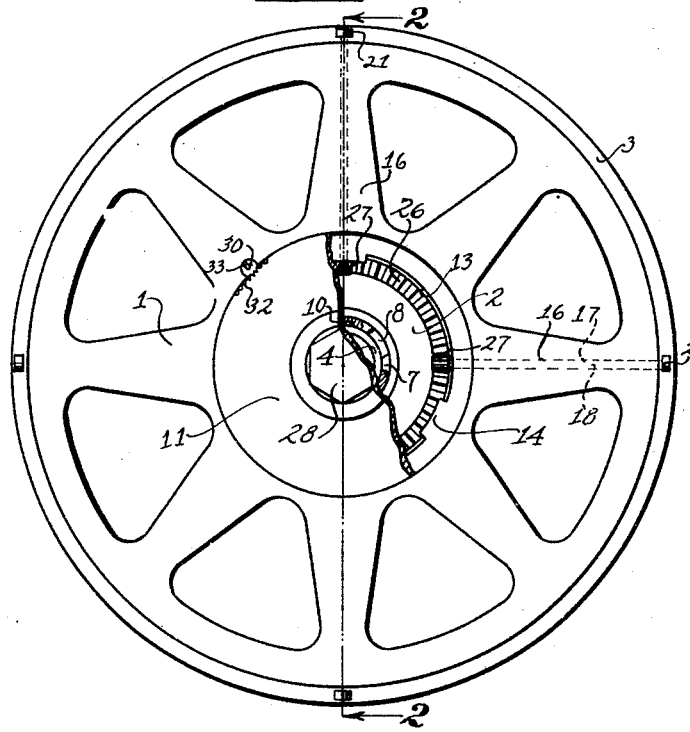
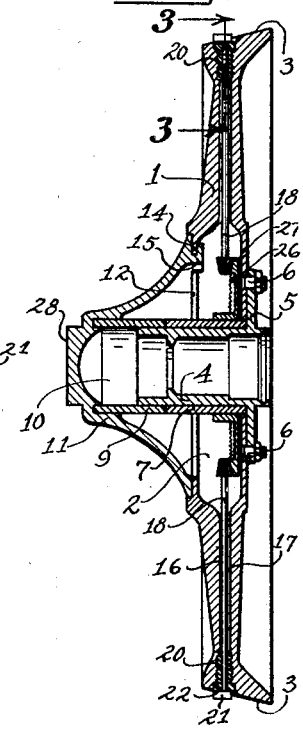
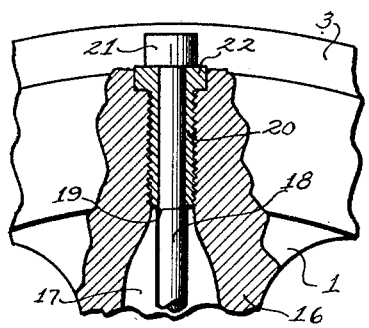
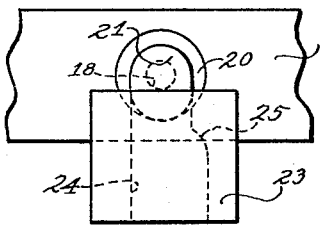
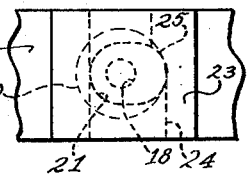
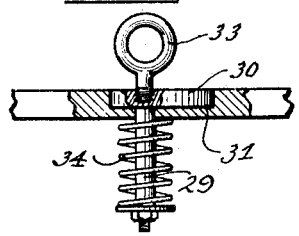
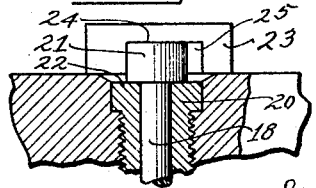
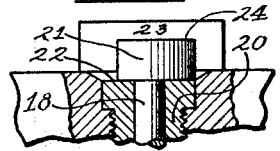
INVENTOR.
George A. Peacock
BY
Harry A. Toulmin
ATTORNEY.

Patented Feb. 14, 1928.

1,659,154

UNITED STATES PATENT OFFICE.

GEORGE A. PEACOCK, OF SAN FRANCISCO, CALIFORNIA.

RIM-LOCKING STRUCTURE FOR METALLIC WHEELS.

Application filed May 24, 1927. Serial No. 193,776.

This invention relates to improvements in vehicle wheels and more particularly to a cast metal wheel and the means for retaining and locking a rim on the periphery thereof, the latter mounting the usual vehicle tire.

The invention has for its principal objects to provide cam means on the ends of shafts radiating from the wheel hub to its periphery through its spokes, the cams engaging rim lugs for forcing the rim transversely of the wheel periphery and retaining and locking the same thereon. Another object is in the provision of gear and pinion means for moving the cams into and from operating position. Another object is to provide a means for locking the gear means in its rotated position when the cams are in full engagement with the rim lugs.

The invention in its present embodiment comprises a plurality of cams associated with the periphery of a cast metallic wheel and carried on the ends of axially rotatable shafts extending radially from the hub to its periphery and having associated with their inner ends means for imparting axial rotation simultaneously to the shafts and for locking the shafts in their rotated position when in locking engagement with cooperating rim lugs.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings accompanying this specification—

Fig. 1 is a view in elevation, partly in section, of a cast metallic wheel disclosing the preferred embodiment of my invention associated therewith.

Fig. 2 is a longitudinal vertical sectional view on line 2—2 of Fig. 1.

Fig. 3 is an enlarged broken sectional view on line 3—3 of Fig. 2, illustrating one of the shaft retaining bushings.

Fig. 4 is a view in detail plan of one of the cams in released position and a rim lug cooperating therewith for sliding movement on or off of the rim.

Fig. 5 is a view similar to Fig. 4 with the rim lug in position over the rim and the cam rotated to locking position.

Fig. 6 is a view in broken detail section of the hub cover locking means.

Fig. 7 is a view in front elevation of the disclosure in Fig. 4.

Fig. 8 is a view in front elevation of the disclosure in Fig. 5.

In the drawings, wherein like characters of reference designate corresponding parts throughout the several views—1 indicates a suitable cast metallic vehicle wheel having a chamber portion 2 in its center and a bevelled or transversely inclined periphery 3. The wheel at its center is provided with a transverse opening through which extends the cylindrical hub 4, the flange 5 of which lies adjacent the inner wall of the wheel and is bolted thereto as at 6. Rotatable on the hub 4 is a sleeve 7, the outer end of which is formed with recesses 8 into which extend interlocking projections 9 on the inner end of the secondary sleeve 10, which also rotates about the hub 4, the secondary sleeve projects inwardly from the inner face of a hub cap 11, as in Fig. 2.

The forward wall of the chamber 2 is open at 12 and the periphery of the opening is arcuately recessed at 13 providing spaced lugs 14 which have interlocking engagement with the channels 15 in the edge of the flaring portion of the hub cap 11. The lugs 14 and slots 15 are so spaced and of a length to admit of the removal of the hub cap 11 from the wheel to admit access to the chamber when the cap is rotated about the hub to move said slots out of register with the lugs. Certain of the spokes 16 of the wheel are provided with longitudinal bores 17 and in said bores are mounted for axial rotation suitable shafts 18, shouldered at 19. The outer ends of shafts 18 extend through bushings 20 affording guides and bearings therefor, and the inner ends of the bushings cooperating with shoulders 19 prevent outward movement of the shafts radially of the wheel. The bushings 20, one associated with the outer end of each shaft and forming a bearing therefor are threaded into the wheel body, as in Fig. 3. The outer end of each shaft 18 carries a cam 21, bearing on the head 22 of the bushing and rotatable from an interlocked position approximately at right angles to the wheel periphery, illustrated in Fig. 4, to a locking position with its axis substantially parallel with the wheel periphery. The rim for demountably securing on the wheel periphery is not shown, the same, however, carries on its inner face, the rim lugs 23 uniformly spaced on its inner surface, one for cooperation with each cam 21. Each rim lug 23 is transversely channeled at 24, the inner end of each channel corresponding to the transverse width of a cam 21, to admit of the lug sliding thereover, Fig. 4, when the cam is in its unlocked position, transversely of the rim periphery. One side wall of each channel is shouldered as at 25 to afford an angular surface for engagement by its associated cam 21 when the latter is rotated from unlocked to locked position, Figs. 5 and 8, with its axis disposed substantially parallel with the rim periphery.

The cams are simultaneously rotated to and from locked position by any suitable mechanism, that form illustrated and preferred, consisting of a beveled gear 26 carried by the sleeve 7 within the wheel chamber portion 2. The gear 26 intermeshes with the beveled fingers 27 on the inner ends of the shafts 18, as clearly illustrated in Figs. 1 and 2. The end surface of the hub cap 11 is of polygonal formation, as at 28, for receiving a suitable wrench, not shown, when it is desired to impart rotation to the sleeve 7 and gear 26 to axially rotate shafts 18 and simultaneously move the cams to and from locked position. The degree of rotation of cams 21 from unlocked to locked position controls the pressure exerted thereby on the shoulders 25 with the rim lugs 23 and affords a means for compensating for wear between the cam surfaces and shoulders 25 and between the inner edges of the rim lugs 23 and the wheel periphery, enabling the rim to be tightly held onto the wheel periphery under all conditions.

Suitable locking means may be provided for holding the cams 21 in locked position, the form illustrated also holding the hub cap 11 in interlocked relation with the wheel closing the opening 12 therein. The preferred structure comprises a guide pin 29 reciprocating in an opening in the front wall of the wheel adjacent the edge opening 12, Fig. 6, and the same on its outer end mounts a peripherally toothed oval disk 30 receivable in an oval depression 31 formed in the wheel surface and intersecting the edge of opening 12. For a portion of its circumference, the edge of hub cap 11 is serrated at 32 to cooperate with the teeth of the disk 30 when the same is received in the depression 31, this engagement of the teeth of the disk with the serrations 32 affording a means for locking the hub cap 11 in its desired adjusted position. To release the disk 30, a screw on the member 33 is inserted into the disk surface, and the disk is elevated against the tension of its seat spring 34, and is axially rotated with the pin 29, removing its periphery from contact with the periphery of the hub cap 11 enabling the same to be rotated causing a releasing or unlocking movement of the cams 21. It will be readily observed that the removal of the hub cap 11 from the hub 4 enables access to be obtained to the interior of the chamber 2 should repairs or adjustments of the interior mechanism become necessary.

I claim:—

1. In combination with a wheel provided with a hub and a plurality of radially disposed tubular bores each communicating at one end with the wheel periphery, a shaft axially rotatable in each bore and held therein from lineal movement, a cam on the end of each shaft and operating over the periphery of the wheel, means cooperating with the shafts for imparting simultaneous axial rotation thereto to position the cams in locking position with their longitudinal axes substantially parallel with the wheel periphery, and a plurality of wheel rim lugs for sliding movement transversely of the wheel periphery and one overlying each cam, each lug being provided with a surface adapted for engagement by its associated cam when the latter is in locked position to prevent the removal of the lugs transversely in one direction from the wheel periphery.

2. In combination with a wheel provided with a hub and a plurality of radially disposed tubular bores, each communicating at one end with the wheel periphery, a shaft axially rotatable in each bore and held therein from lineal movement, a cam on the end of each shaft and operating over the periphery of the wheel, means cooperating with the shafts for imparting simultaneous axial rotation thereto to position the cams in locking position with their longitudinal axes substantially parallel with the wheel periphery, a plurality of wheel rim lugs for sliding movement transversely of the wheel periphery and one overlying each cam, each lug being provided with a surface adapted for engagement by its associated cam when the latter is in locked position to prevent the removal of the lugs transversely in one direction from the wheel periphery, and a releasable lock for holding the cams in locking position.

3. In combination with a wheel provided with a hub and a chamber surrounding the same, said wheel being further provided with a plurality of tubular bores extending radially from the chamber and each communicating at one end with the wheel periphery, a shaft axially rotatable in each bore and held therein from lineal movement, a cam on the end of each shaft and operating over the periphery of the wheel, a member rotatable on the wheel hub and operatively connected with said shafts for imparting simultaneous axial rotation thereto to move the cams into locking position with their longitudinal axes substantially parallel with the wheel periphery, and a plurality of wheel rim lugs for sliding movement transversely of the wheel periphery and one overlying each lug, each lug being provided with a surface adapted for engagement by its associated cam when the latter is in locked position to prevent the removal of the lugs transversely in one direction from the wheel periphery.

4. In combination with a wheel provided with a hub and a chamber surrounding the same, said wheel being further provided with a plurality of tubular bores extending radially from the chamber and each communicating at one end with the wheel periphery, a shaft axially rotatable in each bore and held therein from lineal movement, a cam on the end of each shaft and operating over the periphery of the wheel, a member rotatable on the wheel hub and operatively connected with said shafts for imparting simultaneous axial rotation thereto to move the cams into locking position with their longitudinal axes substantially parallel with the wheel periphery, and a plurality of wheel rim lugs for sliding movement transversely of the wheel periphery and each provided with a channel for receiving one of said cams, one wall of said channel affording a surface for engagement by its cooperating cam when the latter is in locked position to prevent the removal of the lugs transversely in one direction from the wheel periphery.

5. In combination with a wheel provided with a hub and a chamber surrounding the same, said wheel being further provided with a plurality of tubular bores radiating from the chamber and communicating at one end with the wheel periphery, a shaft axially rotatable in each bore and held therein from lineal movement, a cam on the end of each shaft and operating over the periphery of the wheel, a sleeve rotatable on the hub and provided with a gear, a pinion on the inner end of each shaft and intermeshing with said gear, a hub cap axially rotatable on the hub for closing said chamber, and provided with means for engaging said sleeve, the operation of said hub causing said gear to impart simultaneous axial rotation to said shafts to position the cams in locking relation with their longitudinal axes substantially parallel with the wheel periphery, a plurality of wheel rim lugs for sliding movement transversely of the wheel perpihery and one overlying each cam, each lug provided with a face adapted for engagement by its cooperating cam when the latter is in locked position to prevent the removal of the lugs transversely in one direction from the wheel periphery, means for detachably locking the hub cap to the wheel body, and means for releasably locking the hub cap from axial rotation on said hub.

In testimony whereof I have signed my name to this specification.

GEORGE A. PEACOCK.